United States Patent [19]

Kodaira

[11] Patent Number: 4,541,080
[45] Date of Patent: Sep. 10, 1985

[54] ULTRASONIC ALARM DEVICE

[75] Inventor: Makoto Kodaira, Tokyo, Japan

[73] Assignee: Uro Denshi Kogyo Kabushiki Kaisha, Tokyo, Japan

[21] Appl. No.: 316,676

[22] Filed: Oct. 30, 1981

[51] Int. Cl.³ .................................................. G08B 13/16
[52] U.S. Cl. ...................................... 367/94; 340/554; 343/5 PD
[58] Field of Search .......................... 367/94; 340/554; 343/5 PD, 5 CE

[56] References Cited

U.S. PATENT DOCUMENTS

3,465,336 9/1969 Fishbein et al. .................... 340/554
3,681,745 8/1972 Perlman et al. ....................... 367/94

Primary Examiner—Glen R. Swann, III
Attorney, Agent, or Firm—Robert E. Burns; Emmanuel J. Lobato; Bruce L. Adams

[57] ABSTRACT

An ultrasonic alarm device has a detector for detecting a reflected ultrasonic wave in a watching area to obtain a Doppler signal due to motion of a person, a Schmitt circuit for converting the detection output into a pulse output and a waveform shaping circuit for shaping the pulse output into a pulse train having a certain pulse width. The output of the waveform shaping circuit is fed in parallel to two band-pass digital filters, one for the Doppler signal and the other for noise signals. Each of the filters comprises two monostable multivibrators connected in parallel and an AND gate having three inputs of which one is connected through an inverter to the output of one monostable multivibrator, a second is connected to the output of the second monostable multivibrator and the third to the input of the monostable multivibrators. The output of the Doppler signal filter is fed through a first integrator to a level decision circuit while the output of the noise signal circuit is fed through a second integrator to the first integrator. The level decision circuit is connected through a third integrator to an output circuit which produces an alarm signal when the signal level is above a predetermined value. Through this circuitry, the Doppler signal due to motion of a person is distinguished from external disturbances such as those due to wind, a telephone bell, an electric click or movement of a small animal, bird or insect.

9 Claims, 34 Drawing Figures

ULTRASONIC ALARM DEVICE

BACKGROUND OF THE INVENTION

This invention relates to ultrasonic alarm devices which detect the presence or absence of a moving object by utilizing the Doppler effect, to provivde an alarm signal, and more particularly to an ultrasonic alarm device which is used as a burglary preventing device.

It goes without saying that an ultrasonic alarm device must be able to detect an intruder entering the watching area, by utilizing a reflected ultrasonic wave, to provide an alarm signal, and it is essential that the device will not operate errroneously when an external disturbance similar to a reflection signal due to the movement of an intruder (hereinafter referred to as "the movement of a person") takes place in the watching area.

The frequency components of a Doppler signal due to the movement of a person are of the order of 80 Hz when he walks at a speed of about 0.5 m/s, and frequency components due to motion of his hands and feets are distributed on both sides of 80 Hz.

A first example of an external disturbance other than the Doppler signal due to the movement of a person is the wind from a cooler or a draft which is equal to or lower than the Doppler signal due to the movement of a person in frequency. The frequency distribution is such that, in the frequency range of 0 to 150 Hz, the amplitude is decreased as the frequency is increased.

A second example of an external disturbance is for instance a continuous noise signal produced by a telephone bell, the frequency components of which distribute over a relatively wide frequency range including the frequency band of the Doppler signal due to the movement of a person. This external disturbance has a substantially constant amplitude in a frequency range of zero to several kilo-Hertz (KHz) or more.

A third example of an external disturbance is an instantaneous noise such as a noise generated when an object falls down, or an electric click sound. The frequency distribution is similar to that of a continuous noise, except that the noise generation time is short.

A fourth external disturbance is a Doppler signal due to motion of a small animal such as a bird or an insect. The frequency components are substantially similar to those of the Doppler signal due to motion of a person. However, the central frequency is abruptly shifted around the frequency band of the Doppler signal due to motion of a person, because the small animal moves around in different directions and at different speeds.

A countermeasure against each of these external disturbances has been proposed in the art; however, a counter measure against all of the external disturbances has not been proposed yet.

SUMMARY OF THE INVENTION

Accordingly, an object of this invention is to provide an ultrasonic alarm device which positively detects an intruder entering the watching area to provide an alarm signal, but produces no alarm signal for the above-described various external disturbances.

The foregoing object and other objects of the invention have been achieved by the provision of an ultrasonic alarm device which detects an ultrasonic wave reflected in the watching area to obtain a Doppler signal due to motion of a person, thereby to form an alarm output; which, according to the invention, comprises a Schmitt circuit which receives a detection output of the detector and which provides an output at a logic level "1" when the detection output exceeds a predetermined Schmitt level and provides an output at a logic level "0" when not, thus converting the detection output into pulses, the Schmitt circuit providing a pulse output which is obtained by suppressing the high frequency component of the detection output, in response to the amplitude of the low frequency component thereof is high, the pulse output being utilized to distinguish the Doppler signal component due to motion of a person which is included in the detection output from an external disturbance component having a frequency higher or lower than the frequency of the Doppler signal component, and the Doppler signal component thus distinguished being utilized to form an alarm output.

The principle, nature and utility of the invention will become more apparent from the following detailed description when read in conjunction with the accompanying drawings.

BRIEF DESCRIPTION OF THE DRAWINGS

In the accompanying drawings:

FIGS. 2(A-F), 4(A-C), 5(A-L) and 6(A-K) are waveform diagrams for a description of the operation of the ultrasonic alarm device according to the invention.

DETAILED DESCRIPTION OF THE INVENTION

Figure 1:
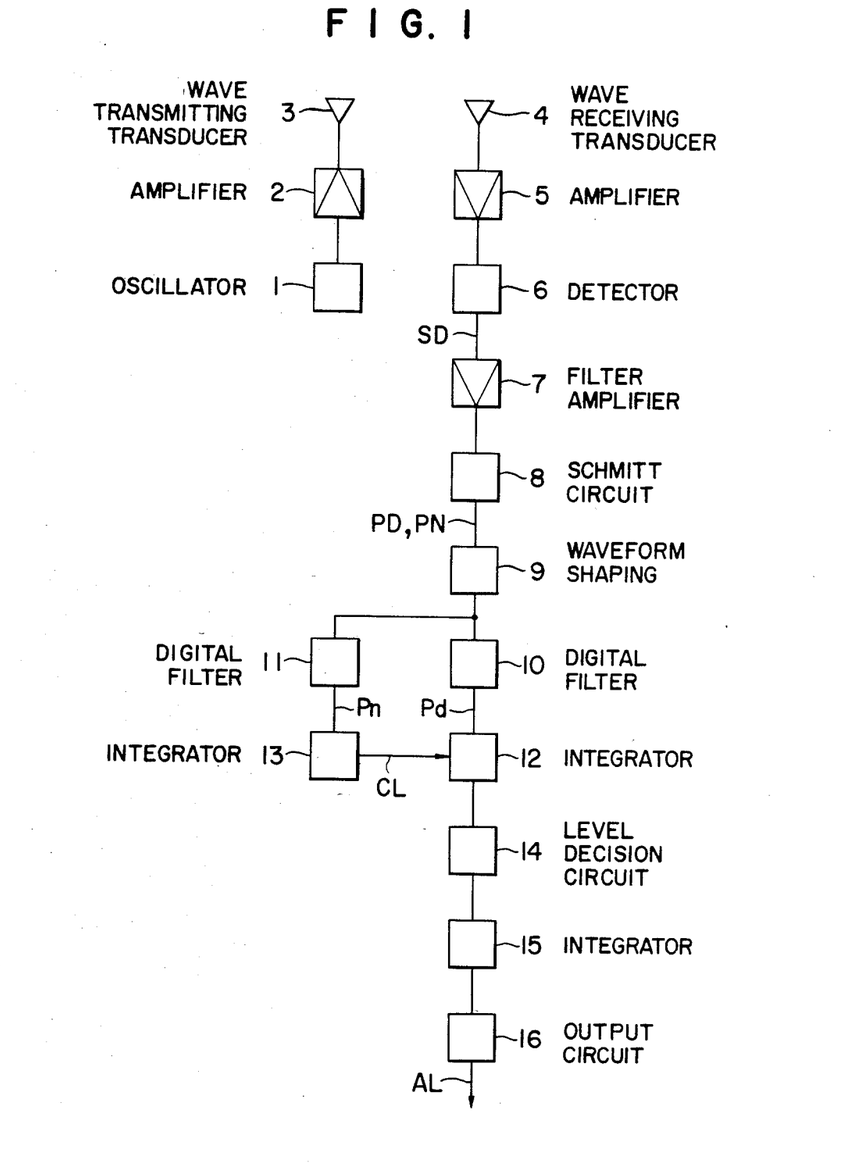
FIG. 1 is a block diagram showing one example of an ultrasonic alarm device according to the invention.

One example of an ultrasonic alarm device according to this invention, as shown in FIG. 1, comprises an ultrasonic oscillator 1 providing an oscillation output of 42 KHz for instance. The output of the ultrasonic oscillator 1 is applied through an amplifier 2 to a wave transmitting transducer 3 which transmits an ultrasonic wave. The ultrasonic wave transmitted by the transducer 3 reaches a wave receiving transducer 4 by being reflected by an object in the watching area.

The wave receiving transducer 4 converts the reflected wave into an electrical signal which is applied through an amplifier 5 to a detector 6. When a wave reflected from a moving object is received, its Doppler signal only is detected and outputted by the detector.

Figure 2:
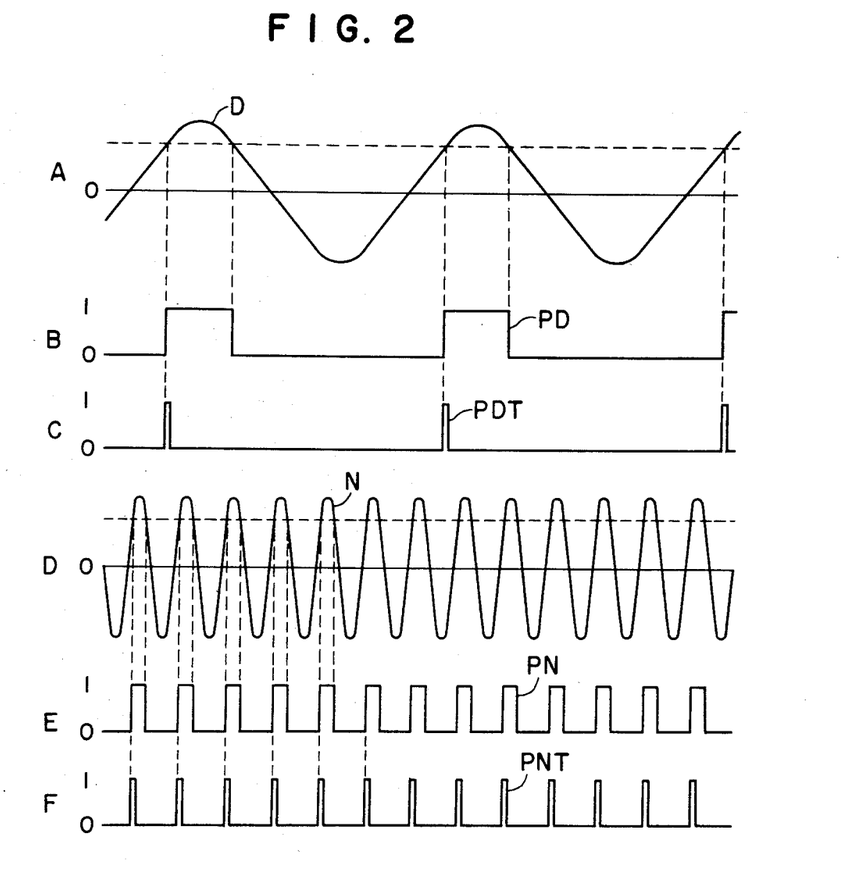

The detection output SD of the detector 6 is applied to a filter amplifier 7, where only the frequency component of 0 to several kilo-Hertz (KHz) is amplified. The output of the filter amplifier 7 is applied to a Schmitt circuit 8. The Schmitt circuit 8 provides an output at a logic level "1" (hereinafter referred to merely as "1", when applicable) when the detection output exceeds a predetermined Schmitt level, and provides an output at a logic level "0" (hereinafter referred to merely as "0", when applicable) when not. For instance in the case when a Doppler signal D representing the movement of a person as shown in the part A of FIG. 2 is received, it is converted into a pulse output PD having the frequency of the Doppler signal representing the movement of the person as shown in the part B of FIG. 2. When a continuous noise signal N as shown in the part D of FIG. 2 is received the detection output SD, it is converted into a pulse output PN having the frequency of the continual noise signal N as shown in the part E of FIG. 2.

The pulse output of the Schmitt circuit 8 is applied to a waveform shaping circuit 9 comprising a differential circuit for instance, as a result of which a pulse train PDT shown in the part C of FIG. 2 or a pulse train PNT shown in the part F of FIG. 2 which rises as the pulse output rises, is provided.

The output of the waveform shaping circuit 9 is applied to a digital filter 10 for the Doppler signal of the movement of a person and to a digital filter 11 for the noise signal.

Figure 3:
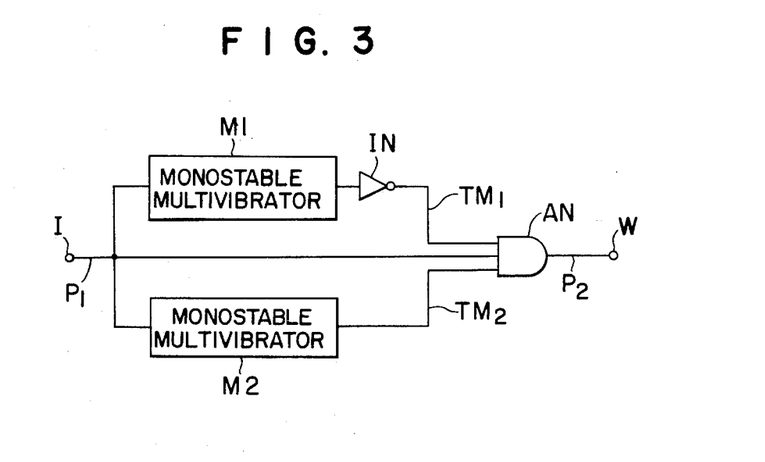
FIG. 3 is a block diagram showing one example of a digital filter in FIG. 1.
Figure 4:
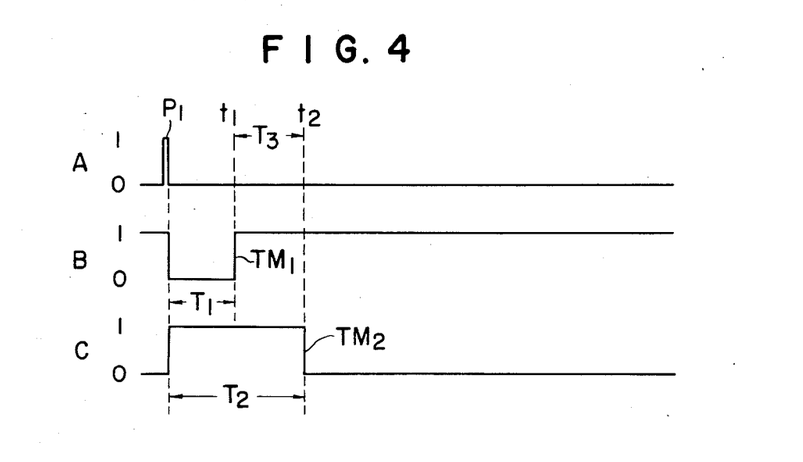

Each of the digital filters 10 and 11, as shown in FIG. 3, comprises two monostable multivibrators M1 and M2 and a three-input AND circuit AN. When a pulse input $P_1$ as shown in the part A of FIG. 4 is applied to the input terminal I, the multivibrators M1 and M2 are triggered by the rise of the pulse input. As a result, the timer output of the multivibrator M1 is applied through an inverter IN, as a first input $TM_1$, to the AND circuit AN, while the output of the multivibrator M2 is applied as a second input $TM_2$ directly to the AND circuit AN. In addition, the pulse input $P_1$ applied to the input terminal I is applied, as a third input, to the AND circuit AN.

The limit time $T_1$ of the first monostable multivibrator M1 is selected shorter than the limit time $T_2$ of the second monostable multivibrator M2. Therefore, when the next pulse $P_1$ is applied to the input terminal during the period of time $T_3$ which elapses from the time instant $t_1$ the time $T_1$ has passed until the time instant $t_2$ the time $T_2$ passes, the AND circuit AN provides a pulse output $P_2$ at the output terminal W.

Figure 5:
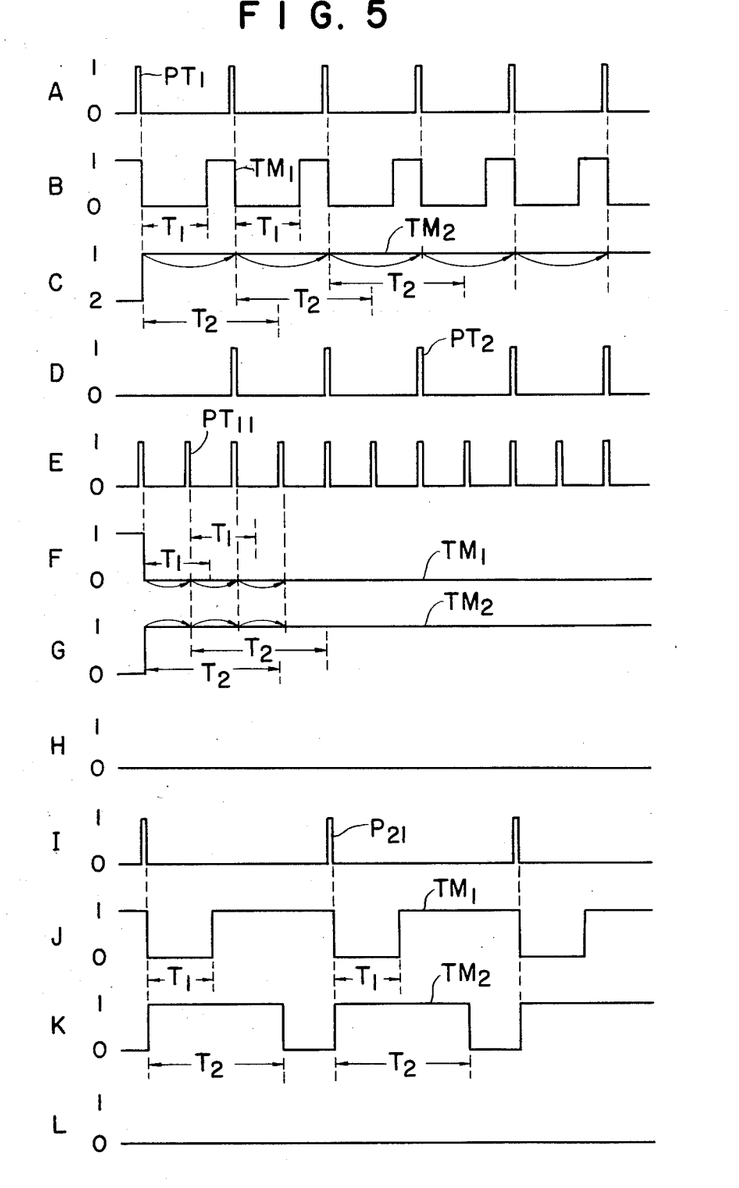

When a pulse train $PT_1$ the period of which, as shown in the part A of FIG. 5, is shorter than the limit time $T_2$ of the second monostable multivibrator M2 but longer than the limit time $T_1$ of the first monostable multivibrator M1 is received, the first and second monostable multivibrators M1 and M2 are triggered thereby. Therefore, as shown in the parts B and C of FIG. 5, the level of the output $TM_1$ of the first monostable multivibrator M1 is inverted, while the second monostable multivibrator M2 is triggered again during the limit time operation, so that it starts the limit time operation newly at that time instant, as a result of which the outputs $TM_2$ appear as one continuous output. Accordingly, of the pulse train $PT_1$ received, the pulses other than the first one, i.e. the pulses $PT_2$ are delivered to the output terminal of the AND circuit AN as shown in the part D of FIG. 5.

When a pulse $PT_{11}$ whose period is shorter than the limit time $T_1$ of the first multivibrator M1 as shown in the part E of FIG. 5 is received, the first and second multivibrators M1 and M2 are triggered again before their limit times $T_1$ and $T_2$ have passed. Therefore, the outputs $TM_1$ and $TM_2$ are provided as continuous ones without inverting their levels. Accordingly, no pulse output is delivered to the output terminal of the AND circuit AN as shown in the part H of FIG. 5.

When, in contrast to the above-described case, a pulse $P_{21}$ whose period is longer than the limit time $T_2$ of the second multivibrator M2 is received, the level of the output of the second multivibrator M2 has been inverted (the parts J and K of FIG. 5). Accordingly, no pulse output is delivered to the output terminal of the AND circuit AN.

As is apparent from the above description, upon reception of a pulse whose period is longer than the limit time $T_1$ of the first multivibrator M1 and shorter than the limit time $T_2$ of the second multivibrator M2, the digital filters 10 and 11 allow the pulse to pass therethrough. In other words, the digital filters serve as band pass filters through which only pulses in a predetermined frequency band can pass.

The digital filter 10 for the Doppler signal of the movement of a person has a pass band of 40 to 280 Hz for instance, in order to transmit the Doppler signal D. On the other hand, the digital filter 11 for the noise has a pass band of 600 Hz to 2.3 KHz for instance so that, in a frequency range higher than the Doppler signal components of the movement of a person, it does not transmit the Doppler signal components of the movement of a person, but transmits noise components. Thus, the limit times $T_{11}$ and $T_{21}$ of the multivibrators M1 and M2 in the digital filter 10 for the Doppler signal of the movement of a person are larger than the limit times $T_{12}$ and $T_{22}$ of the multivibrators M1 and M2 in the digital filter 11 for the noise.

The pulse outputs of the digital filters 10 and 11 are applied respectively to quick discharge type integration circuits 12 and 13. The integration circuits are so designed that, when pulse intervals are short, successively applied pulse are integrated, but when pulse intervals are long, pulses are not integrated, because a discharge operation is effected immediately after each pulse integration operation.

The integration circuit 12 coupled to the digital filter circuit 10 applies its output to a level decision circuit 14. When the output of the integration circuit 12 exceeds a predetermined decision level, the detection output is applied through an integration circuit 15 to an output circuit 16. Thus, when the detection output is obtained continuously for a predetermined period of time in the level decision circuit 14, the output circuit 16 provides an alarm output AL.

On the other hand, the time constant of the integration circuit 13 connected to the digital filter 11 for the noise is selected much smaller. Therefore, when noise pulses having a short period are applied to the digital filter 11, a predetermined integration level is obtained in a relatively short period of time, and the integration output thereof clears the integration value of the integration circuit 12 on the Doppler signal side.

Figure 6:
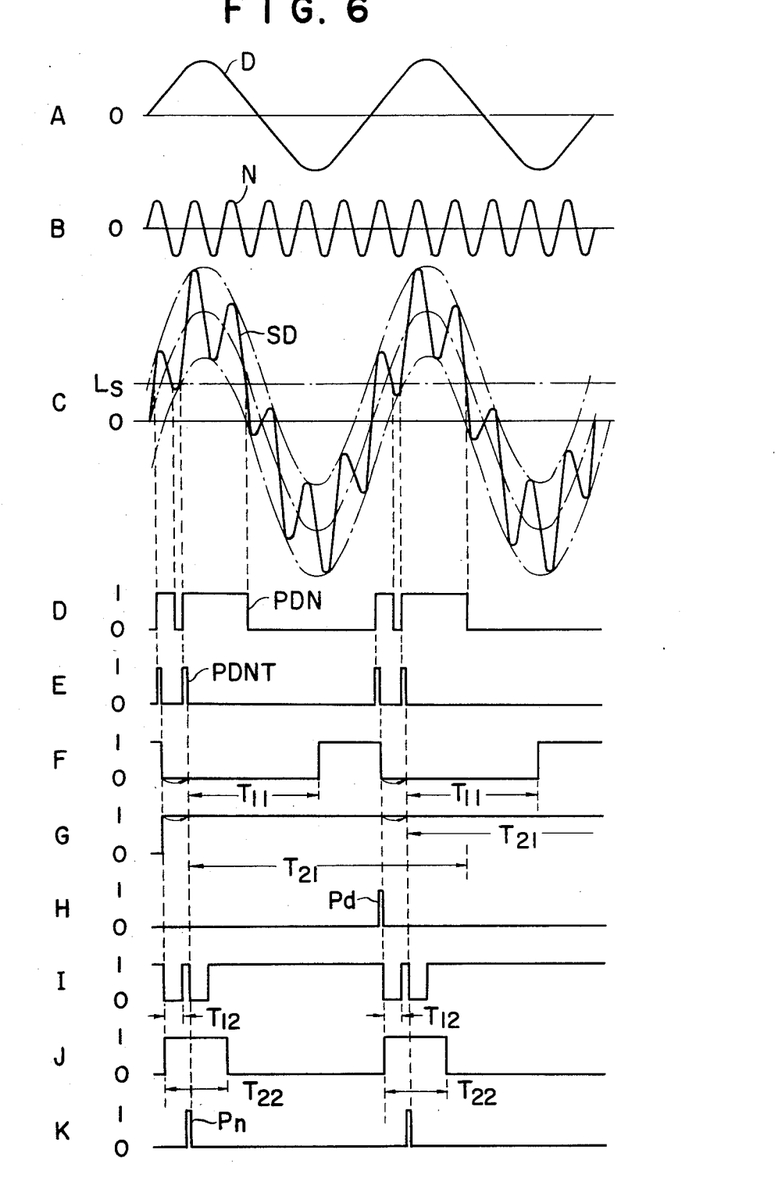

When a detection signal SD as shown in the part C of FIG. 6 which is obtained by superposing a continuous noise signal N such as a telephone bell sound as shown in the part B of FIG. 6 on a Doppler signal D of the movement of a person as shown in the part A of FIG. 6 is obtained at the output terminal of the detector 6, a pulse output PDN as shown in the part D of FIG. 6 which is raised to "1" when the detection output SD exceeds a Schmitt level Ls in the Schmitt circuit 8 is provided, and a pulse train output PDNT having a constant pulse width as shown in the part E of FIG. 6 which is subjected to waveform shaping at the rise of the pulse output PDN is obtained.

When the level of the detection output SD is near the Schmitt level Ls, the detection output SD goes frequently across the Schmitt level Ls because of the presence of noise components. However, when the level of the detection output SD is near the maximum value of the Doppler signal D of the movement of a person, the detection output SD will not go across the Schmitt level Ls. Therefore, the pulse distribution of the pulse train output PDNT is such that during the period in which the detection output SD is close to the Schmitt level Ls, the frequency is high (substantially close to the frequency of the noise signal N), and during the period in which the detection output SD is close to the maximum value, no pulse is produced (as for the entire pulse train, the frequency being close to the frequency of the Doppler signal D of the movement of a person).

In the digital filter 10 on the side of the Doppler signal of the movement of a person, the first and second multivibrators M1 and M2 are triggered by the first pulse of the pulse train output PDNT, and the outputs of the multivibrator M2 are provided as one continuous output, as shown in the parts F and G of FIG. 6. Therefore, as shown in the part H of FIG. 6, the first pulse is applied, as a passed pulse Pd, to the integration circuit 12. This operation is repeatedly carried out. Therefore, a pulse train Pd having substantially the same period as that of the Doppler signal D is applied to the integration circuit 12.

On the other hand, in the digital filter 11 on the side of the noise signal, as shown in the parts I and J of FIG. 6, the first and second multivibrators M1 and M2 are triggered by the first pulse of the pulse train output PDNT, and the second pulse is applied after the lapse of the limit time $T_{12}$ of the first multivibrator M1 but before the lapse of the limit time $T_{22}$ of the second multivibrator M2. Therefore, in this case, the second pulse is applied, as a passed pulse Pn, to the integration circuit 13. This operation is repeatedly carried out. Accordingly, a pulse train Pn having substantially the same period as that of the Doppler signal D is applied to the integration circuit 13.

The time constant of the integration circuit 12 in the Doppler signal system is large, and therefore whenever each pulse of the pulse train Pd arrives, it is integrated. On the other hand, the time constant of the integration circuit 13 in the noise signal system is small, and therefore whenever each pulse of the pulse train arrives, it is quickly discharged. Accordingly, no clear signal CL is applied from the integration circuit 13 in the noise signal system to the integration circuit 12 in the Doppler signal system. Thus, the integration output of the integration circuit 12 is applied to the level decision circuit 14, and when it exceeds the decision level, the output circuit 16 provides the alarm output AL.

The operation of the ultrasonic alarm device has been described with respect to the case where the continuous noise signal smaller in amplitude than the Doppler signal D is superposed on the latter. In the case where, while the amplitude of the continuous noise signal is maintained unchanged, the amplitude of the Doppler signal D of the movement of a person is decreased, the detection output SD goes across the Schmitt level Ls more frequently during the period in which the level of the detection output SD is close to the Schmitt level Ls. Therefore, the digital filter 11 in the noise system transmits not only one pulse (which is the second pulse of the pulse train output PDNT) as was described above with reference to the part K of FIG. 6 but also other following pulses (which are the third pulse, the forth pulse and so forth of the pulse train output PDNT) successively. However, during the period in which the detection output SD is close to the maximum value, the detection output SD will not go across the Schmitt level Ls. Therefore, no clear signal CL is outputted by the integration circuit 13 in the noise signal system, and the alarm output is positively provided.

In the case where, while the amplitude of the Doppler signal of the movement of a person is maintained unchanged, the amplitude of the noise signal is increased, similarly the number of pulses passed through the digital filter 11 in the noise signal system is increased according to the continuous noise signal N.

It may be considered that, if the integration circuit 13 in the noise signal system starts the integration operation before the quick discharge operation has been accomplished, then the integration circuit 13 applies the clear signal CL to the integration circuit 12 in the Doppler signal system, so that the alarm output AL is discontinued. However, such a trouble can be eliminated by adjusting the strength of the Doppler signal to a value suitable for the watching area (so that the amplitude of the Doppler signal exceeds the Schmitt level Ls when an intruder enters the watching area).

In the case where a continuous noise signal having a constant frequency is generated as described with reference to the part D of FIG. 2 under the condition that no intruder is in the watching area, no pulse train output is applied to the digital filter 10 of the Doppler signal system, and therefore no alarm output AL is provided by the output circuit 16.

The operation has been described with reference to the case where the generated noise signal is constant in frequency (for instance, 600 to 2300 Hz). However, no erroneous operation is caused even in the case where a continuous noise signal whose frequency components vary at random is received under the condition that the Doppler signal on the movement of a person is not received.

In the case where a noise signal having a frequency other than those in the frequency band (40 to 280 Hz in the example) of the Doppler signal D on the movement of a person is caused, no pulse train output is provided by the digital filter 10 in the Doppler signal system, and accordingly no alarm output AL is provided by the output circuit 16.

When frequency components in the frequency band of the Doppler signal of the movement of a person arrive as a part of the noise signal components, then during the arrival the digital filter 10 of the Doppler signal system provides the pulse outputs, and therefore the integration circuit 12 performs the integration. However, when the continuous noise frequency distribution varies at random so that the noise frequency is shifted from the Doppler signal frequency band (40 to 280 Hz) to the pass band (600 to 2300 Hz) of the digital filter of the noise signal system, then the digital filter 10 provides no output pulse, and instead the digital filter 11 provides the output pulse. Therefore, the integration circuit 13 starts the integration, and finally provides the clear signal CL. As a result, the integration circuit 12 of the Doppler signal system is cleared, and the output circuit 16 provides the alarm output AL.

When a single noise signal such as an impulsive noise signal which is not continuous arrives, the noise effect can be eliminated similarly as in the continuous noise signal, because the case is similar to the case of the continuous noise signal arrival except that the noise generation time is shorter than in the case of the continuous noise signal arrival.

The operation of the ultrasonic alarm device has been described with respect to the case where the noise signal components are higher in frequency than the Doppler signal of the movement of a person. In the case where an external disturbance is caused by wind, or with respect to the low frequency components of a continuous or impulsive noise signal, it operates as follows: That is, if, in the case where the detection output SD has external disturbance frequency components lower than the frequency of the Doppler signal of the movement of a person, the amplitude of the Doppler signal D is small, then similarly as in the case described with reference to the part C of FIG. 6 a pulse train signal having a frequency close to the frequency of an external disturbance due to wind or noise having low frequency components is obtained in the waveform shaping circuit 9. In other words, the Doppler signal component of the movement of a person having high frequency components is suppressed in response to the amplitude of the noise signal due to the external disturbance of wind having low frequency components is high, while being formed into pulses by the Schmitt circuit 8.

If, under this condition, the amplitude of the Doppler signal D is increased, then the detection output SD goes frequently across the Schmitt level Ls. Therefore, a pulse train output having the frequency of the Doppler signal component is provided at the output terminal of the waveform shaping circuit 9, whereby the digital filter 10 of the Doppler signal system outputs the pulse train Pd, and therefore the output circuit 16 provides an alarm output AL.

Thus, if the amplitude of the Doppler signal of the movement of a person is large even in the case where there is an external disturbance due to wind, the alarm device will operate satisfactorily.

As is apparent from the above description, according to the invention, of the detection output components the high frequency signal component can be suppressed according to the amplitude of the relatively low frequency signal component by forming the detection output of the reflected wave into pulses by the Schmitt circuit 8. Thus, the Doppler signal of the movement of a person can be converted into the pulse train which can be distinguished from an external disturbance (due to wind for instance) having a frequency lower than the frequency of the Doppler signal or an external disturbance (due to a continuous or impulsive noise signal) having a high frequency, whereby the Doppler signal of the movement of a person can be positively detected in a digital mode by using the digital filters.

The employment of the digital filters makes the filter cut-off characteristic of the alarm device of the invention considerably steep when compared with that of an ultrasonic alarm device using analog filters. Therefore, erroneous operations due to external disturbances caused by wind or other noises can be positively eliminated.

In the invention, the outputs of the digital filter 11 of the noise signal system are integrated, so that the integration result is utilized to clear the digital filter 10 of the Doppler signal system. Therefore, no erroneous operation is caused even in the arrival of an external disturbance which produces at random frequency components which are included in the frequency band of the Doppler signal of the movement of a person.

If the ultrasonic alarm device as described above is so modified that the limit times $T_1$ and $T_2$ of the timers M1 and M2 (FIG. 3) of each of the digital filters 10 and 11 can be changed as desired, then the alarm conditions of the ultrasonic alarm device can be adjusted according to the environmental conditions of the watching area. The adjustment can be made for instance as follows: If the watching area is greatly affected by the external disturbance of wind, the pass band of the digital filter 10 of the Doppler signal system is so adjusted as to avoid the frequency band of the external disturbance. The adjustment of the time limits of the timers M1 and M2 can be achieved merely by changing the values of the capacitance or resistance thereof.

What is claimed is:

1. An ultrasonic alarm device in which an ultrasonic wave is transmitted to a watching area, and the ultrasonic wave reflected is detected by a detector to obtain a Doppler signal in a predetermined frequency band due to motion of a person, thereby to form an alarm output; which comprises:
    (a) a Schmitt circuit which receives a detection output of said detector and which provides an output at a logic level "1" when said detection output exceeds a predetermined Schmitt level, and provides an output at a logic level "0" when said detection output does not exceed said predetermined Schmitt level, thus converting said detection output into pulses;
    (b) a waveform shaping circuit responsive to leading edges of the pulses output by said Schmitt circuit for shaping a pulse output of said Schmitt circuit into a pulse train having pulses of constant narrow pulse width, whereby frequency discrimination of the Schmitt circuit outputs is possible, and
    (c) a digital band pass filter for transmitting, of a pulse output of said waveform shaping circuit, a pulse train having a frequency included in the frequency band of said Doppler signal,
    (d) means for integrating the output of said digital filter, and
    (e) means for producing an alarm output when the output of said integrating means is above a predetermined level for a predetermined time.

2. An ultrasonic alarm device in which an ultrasonic wave is transmitted to a watching area, and the ultrasonic wave reflect is detected by a detector to obtain a Doppler signal in a predetermined frequency band due to motion of a person, thereby to form an alarm output; which comprises:
    (a) a Schmitt circuit which receives a detection output of said detector and which provides an output at a logic level "1" when said detection output exceeds a predetermined Schmitt level, and provides an output at a logic level "0" when said detection output does not exceed said predetermined Schmitt level, thus converting said detection output into pulses;
    (b) a waveform shaping circuit for shaping a pulse output of said Schmitt circuit into a pulse train having a predetermined pulse width;
    (c) a first digital band pass filter for transmitting, of a pulse output of said waveform shaping circuit, a pulse having a frequency included in the frequency band of said Doppler signal;
    (d) a first quick discharge type integration circuit for integrating an output of said first digital filter;
    (e) a second digital filter for transmitting, of said pulse output of said waveform shaping circuit, a pulse having a frequency included in a frequency band other than the frequency band of said Doppler signal;
    (f) a second quick discharge integration circuit for integrating an output of said second digital filter, to clear said first integration circuit when the integration result of said second integration circuit reaches a predetermined level; and (g) a level decision circuit for providing an alarm output when an output of said first integration circuit reaches a predetermined level.

3. A device as claimed in claim 2, in which each of said first and second digital filters comprises:
   first and second time circuits different in limit time, which are triggered by said output pulse of said waveform shaping circuit; and
   an AND circuit receiving timer outputs of said first and second timer circuits and said output pulse of said waveform shaping circuit.

4. A device as claimed in claim 2, in which the time constant of said second integration circuit is smaller than the time constant of said first integration circuit.

5. An ultrasonic alarm device in which anultrasonic wave is transmitted to a watching area and the ultrasonic wave reflected is detected by a detector to obtain a Doppler signal in a predetermined frequency band due to motion of a person in said area and to form an alarm signal, which comprises:
   a Schmitt circuit which receives a detection output of said detector and which provides an output at a logic level "1" when said detection output exceeds a predetermined Schmitt level and provides an output at a logic level "0" when said detection output does not exceed said predetermined Schmitt level, thereby converting said detection output into pulses,
   waveform shaping means receiving the output of said Schmitt circuit and shaping said output into a pulse train having pulses of a constant pulse width,
   a first digital band pass filter receiving the output of said waveform shaping means and passing pulses having a frequency included in the frequency band of said Doppler signal,
   first integrating means for integrating the output of said first digital band pass filter, a second digital band pass filter receiving the output of said waveform shaping means in parallel with said first digital band pass filter and passing pulses in a frequency band higher than the frequency band of said Doppler signal,
   second integrating means for integrating the output of said second digital band pass filter and having an output connected with said first integrating means, to reset said first integrating means,
   level decision circuit means for evaluating the output of said first integrating means and providing an output signal when the level of said output is above a predetermined value for a predetermined time and
   output circuit means receiving said output signal of said level decision means and providing an alarm signal.

6. A device claimed in claim 5, in which each of said digital band pass filters comprises first and second monostable multivibrators connected in parallel with one another and an AND gate having three input terminals of which one is connected with the output of one of said monostable multivibrators, a second is connected through an inverter with the output of the other of said monostable multivibrators and the third is connected with the common input of said monostable multivibrators.

7. A device as claimed in claim 6, in which the limit time of one of said monostable multivibrators is shorter than the limit time of the other of said monostable multivibrators.

8. A device as claimed in claim 5, in which said output terminal circuit means comprises means for integrating the output of said level decision circuit means and means for providing an alarm signal when a detection output of said level decision circuit means is obtained continuously for a predetermined period of time.

9. An ultrasonic alarm device in which an ultrasonic wave is transmitted to a watching area, and the ultrasonic wave reflected is detected by a detector to obtain a Doppler signal in a predetermined frequency band due to motion of a person, thereby to form an alarm output, which comprises:
   (a) a Schmitt circuit which receives a detection output of said detector and which provides an output at a logic level "1" when said detection output exceeds a predetermined Schmitt level, and provides an output at a logic level "0" when said detection output does not exceed said predetermined Schmitt level, thus converting said detection output into pulses;
   (b) a waveform shaping circuit for shaping a pulse output of said Schmitt circuit into a pulse train having pulses of a constant pulse width,
   (c) a digital band pass filter for transmitting, of a pulse output of said waveform shaping circuit, a pulse train having a frequency included in the frequency band of said Doppler signal, said digital filter comprising first and second timer circuits different in limit time, which are triggered by said output pulses of said waveform shaping circuit, and an AND circuit receiving outputs of said first and second timer circuits and said output pulses of said waveform shaping circuit; and
   (d) means for producing an alarm signal when the output of said digital filter is above a predetermined level.

* * * * *